April 3, 1928.
J. H. MITTER
1,664,638
FLOOR CONSTRUCTION
Filed Feb. 23, 1926
2 Sheets-Sheet 1
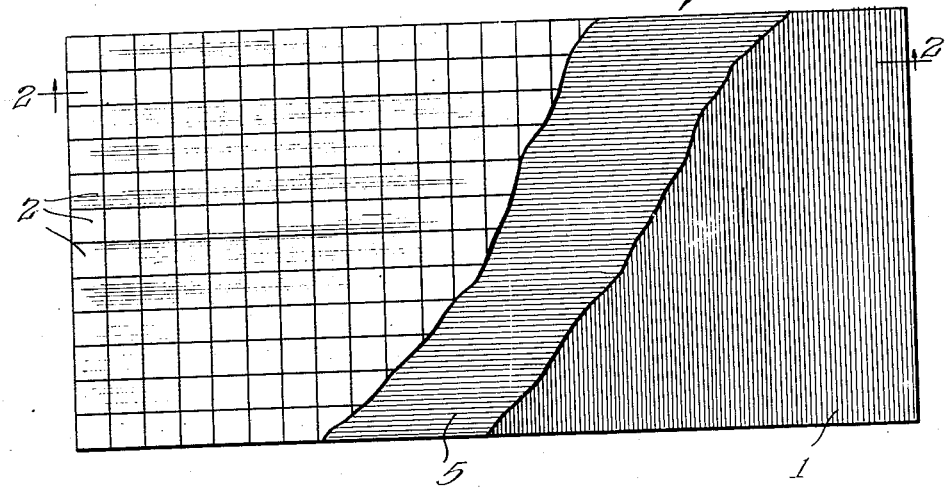
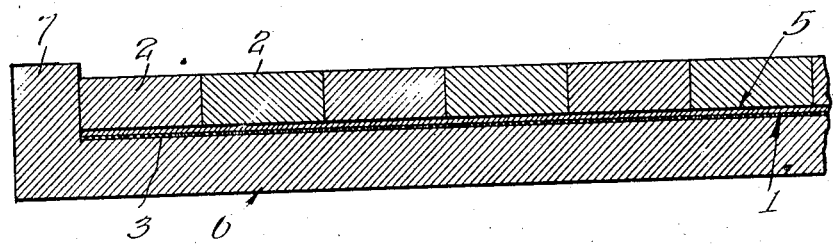
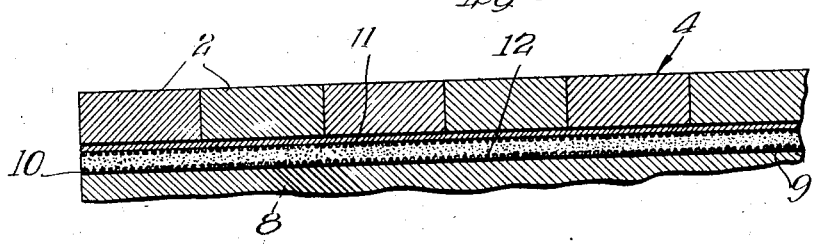
Inventor
Joseph H. Mitter April 3, 1928.
J. H. MITTER
1,664,638
FLOOR CONSTRUCTION
Filed Feb. 23, 1926
2 Sheets-Sheet 2
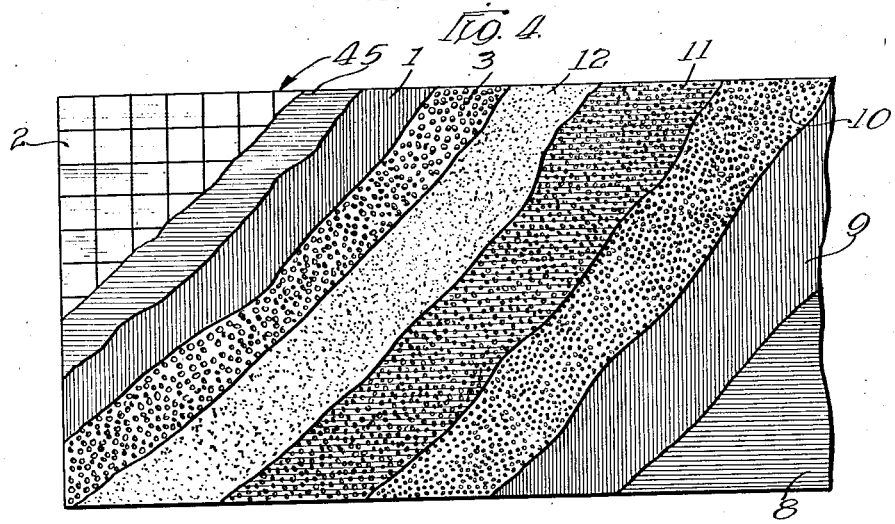

Patented Apr. 3, 1928.

1,664,638

UNITED STATES PATENT OFFICE.

JOSEPH H. MITTER, OF CHICAGO, ILLINOIS.

FLOOR CONSTRUCTION.

Application filed February 23, 1926. Serial No. 89,987.

My invention relates to improvements in floor constructions and has special reference to improved means and methods of constructing tile floors.

In the construction of floors of the kind mentioned there is first provided a foundation upon and to which the floor proper is laid and secured. The foundation may be made of wood, concrete or other construction materials, the character of the foundation, to some extent influencing the specific means and methods of applying the top or wearing floor.

The object of my invention is to provide means and methods by which a top or wearing floor, composed of many pieces such as tile shall be permanently and securely bonded and attached to the foundation whatever it may be; and which construction shall include a yielding or cushion member or sheet which shall effectively prevent the transmission of cracks or breaks from the foundation to the top or wearing floor.

One important feature of my invention resides in the simple means and methods I employ to produce a permanent bond between the foundation and the floor proper. This consists in applying asphaltum paint in rather thick condition to the surface of the foundation upon which it is intended to lay a floor. This paint when dry forms a perfect bond with the foundation, whether the foundation is wood or concrete. I preferably mix some litharge with the paint to make it set and I thin the paint to a proper consistency with a suitable oil such as naphtha. Having applied the asphalt paint, I next scatter fine crushed stone over the surface of the paint before the paint dries and hardens and I roll the crushed stone into the paint. This operation causes the particles of stone to be partly imbedded in the asphalt paint and they are by this means bound to the paint, and consequently to the foundation. If all of the stone particles do not adhere to the paint the loose particles can be swept off.

I then allow the construction to dry and harden for a sufficient time, say from 12 to 24 hours. Then I apply a thin wash of cement water to the stone particles which conditions them to cause the next material to be bound permanently to them. This next material consists of a suitable mixture of sand and cement, preferably about one part of cement to two parts of sand. This mixture I spread evenly over the foundation to produce a suitable level surface.

In laying a floor of tiling I preferably proceed as follows: I take sheets of the prepared bonding material, viz, roofing paper or the like of the kind described. These sheets are preferably about one or two feet wide by about three feet long. I secure the tile pieces to the smooth sides of these sheets, securing them by the asphalt paint before referred to. The tile pieces cover the whole of the surface of the sheets so that when the floor is covered by means of a number of these prepared sheets the tiles form a continuous covering or surface. As described, the surface of the sheets carrying the stone particles is the under side.

The prepared level surface of cement and sand makes a bond between the coated side of the sheets which carry the tiles and the stone particles secured in the asphalt paint. Having laid and leveled the coating of the mixture of sand and cement, I next cover the whole surface with the prepared tile sheets, laying them close together, first, if necessary, wetting the coated undersides of the sheets with cement water. After the tile sheets have been properly pressed down and leveled, the joints between the tile pieces can be filled in the usual manner and the floor cleaned and polished.

My invention will be more readily understood by reference to the accompanying drawings forming part of this specification, and in which:—

Fig. 1, is is a plan view of a prepared tile sheet with which to make a tile floor, the tile being partly removed to show the backing upon which the tile is secured;

Fig. 2, is an enlarged section through the tile and backing on the line 2—2 of Fig. 1 and includes the tray 6;

Fig. 3, is a section similar to Fig. 2, but showing the tile sheet secured to the floor foundation; and Fig. 4, is a plan view particularly illustrating the completed floor, as shown in Fig. 3, the various layers or parts being exposed to best show the method of procedure.

In said drawings 1 illustrates a fibrous or yielding backing sheet to which the tiles 2 are secured. The sheet 1 comprises a body of paper or other yielding material such as jute, the whole impregnated with asphalt which makes the sheet waterproof and coated on one side with fine crushed stone particles or torpedo sand 3. The opposite surface 7 of the sheet is smooth and the tiles are secured to this smooth side.

I secure the tiles by first coating the smooth side of the base 1 with asphalt paint 5 and I then place the tiles 2 upon the sheet while the paint is still soft. I prefer to add some litharge to ordinary asphalt paint to cause the paint to harden in a reasonable time, that is, 12 to 24 hours, and I thin the paint to a proper consistency, preferably with naphtha.

The preparation of the sheets 4 is done in a suitable factory. Preferably the sheets 1 are placed in shallow trays 6 provided with rims or margins 7, within which the sheet fits accurately, and then they are painted with the prepared asphalt paint and when this has partly dried the tiles 2 are placed on the sheet filling in within the margins 7, and then the tray is set away to permit the asphalt to harden. It will be understood from the above that the prepared sheets 4 are articles of manufacture, that they can be produced at a minimum of labor cost in a suitable factory and that when then sent out on a job to be laid they will greatly simplify and cheapen the making of such tile floors.

Having prepared suitable sheets 4 with the required tile the next step in producing a tile floor is to prepare the foundation for receiving these sheets. This process is illustrated in Figs. 3 and 4.

The foundation upon which the tile floor is to be laid is illustrated at 8; it may be either wood, cement or other building construction material, it is usually rough and uneven. In order to prepare this base I first paint it with a relatively heavy coat 9 of the asphalt paint and then cover this paint with a relatively thin layer of relatively fine stone particles or torpedo sand 10, and press this covering granular material into the asphalt paint by means of a suitable roller. This causes these particles to sink in and adhere firmly to the asphalt paint and by means of the paint to the base or foundation 8. If there is much loose sand on the floor after the asphalt paint has hardened this may be swept off. I next wash the base with cement water, indicated at 11, thus coating the exposed surfaces of the granular particles with cement and thus preparing them to receive and form a bond with the next layer.

The next layer, in making a tile floor, consists of a mixture of cement and sand 12 which I next apply in order to be able to make a true level surface upon which to lay the prepared sheets of tile 4. This layer 12, preferably of about one part of cement to two parts of sand, may be relatively thin but is sufficient to provide a true level surface. This layer 12 of cement and sand makes a perfect bond to the granular particles partly imbedded in the asphalt paint, and consequently this layer of cement and sand is thoroughly bound to the foundation.

Before this layer 12 sets I lay down the prepared sheets 4, having first washed the granular or under surfaces thereof with cement water so as to prepare this surface to thoroughly bind to the layer 12 of sand and cement. The several prepared sheets 4 are laid down in close order and are pounded down into proper level flat condition causing the granular under surfaces thereof to sink into the soft layer 12. After the layer 12 has set the floor can be finished by washing cement into the interstices between the tiles and rubbing and polishing the top surface as usual.

I claim:

1. A floor of the kind described, comprising a base, a coating of asphaltic paint on the base, a coating of granular particles partly embedded in the paint, a top layer of cement applied to the exposed surface of the granular particles, and a layer of tile bonded to the cement by means of a layer of fibrous material, the fibrous sheet material having a smooth surface to which the tiles are secured by asphaltic material and having a granular coating secured to the opposite side by asphaltic material, the sheet material bonded to the cement by means of the said granular material on the fibrous sheet.

2. A floor of the kind described, comprising a base, a coating of asphaltic material on the base, a coating of granular particles partly embedded in the asphaltic material, a layer of cement applied to the coating of granular particles and a layer of tile bonded to the cement by means of a sheet of fibrous sheet material, the tiles secured to one surface of the sheet material by asphaltic material, the opposite surface of the sheet material coated with granular particles secured by asphaltic material, the sheet material bonded to the cement by means of said granular material.

3. A floor of the kind described, comprising a base, a coating of asphalt paint on the base, a coating of granular particles partly embedded in the paint, a top layer of plastic material applied to the exposed surface of the granular particles, and a layer of tile bonded to the plastic material by means of a layer of fibrous material, the fibrous sheet material having a smooth surface to which the tiles are secured by asphaltic material and having a granular coating secured to the opposite side by asphaltic material, the granular side of the sheet material bonded to the plastic material by means of the said granular material on the fibrous sheet.

4. A floor of the kind described, comprising a base, a coating of asphaltic material on the base, a coating of granular particles partly embedded in the asphaltic material, a layer of plastic material applied to the coating of granular particles and a layer of tile bonded to the plastic material by means of a sheet of fibrous sheet material, the tiles secured to one surface of the sheet material by asphaltic material, the opposite surface of the sheet material coated with granular particles secured by asphaltic material, the sheet material bonded to the plastic material by means of said granular material.

5. A floor of the kind described, comprising a base, a layer of plastic material on the base adapted to provide a level top surface and a layer of tile bonded to the plastic material by a layer of sheet fibrous material, the fibrous sheet material having the tile secured to the top surface of the fibrous sheet material by suitable cementitious material, and the lower side of said fibrous sheet material having a granular coating adapting it to be bonded to the plastic material.

In testimony whereof, I have hereunto set my hand, this 15th day of February, 1926.

JOSEPH H. MITTER.